(12) United States Patent
Su et al.

(10) Patent No.: US 11,674,594 B2
(45) Date of Patent: Jun. 13, 2023

(54) TRANSMISSION STRUCTURE OF ELECTRIC CLUTCHLESS MOTORCYCLE

(71) Applicants: Kuo-Hsin Su, New Taipei (TW); Ta-Yu Su, New Taipei (TW)

(72) Inventors: Kuo-Hsin Su, New Taipei (TW); Ta-Yu Su, New Taipei (TW)

( * ) Notice: Subject to any disclaimer, the term of this patent is extended or adjusted under 35 U.S.C. 154(b) by 0 days.

(21) Appl. No.: 17/510,769

(22) Filed: Oct. 26, 2021

(65) Prior Publication Data

US 2023/0129368 A1    Apr. 27, 2023

(51) Int. Cl.
*F16H 61/32*  (2006.01)
*B62M 9/04*  (2006.01)
*F16H 57/02*  (2012.01)

(52) U.S. Cl.
CPC .............. *F16H 61/32* (2013.01); *B62M 9/04* (2013.01); *F16H 57/02* (2013.01); *F16H 2057/02065* (2013.01)

(58) Field of Classification Search
CPC ................ F16H 61/32; F16H 57/02; F16H 2057/02065; B62M 9/04
See application file for complete search history.

(56) References Cited

U.S. PATENT DOCUMENTS

| | | | | |
|---|---|---|---|---|
| 6,131,682 A | * | 10/2000 | Walker | F02B 61/02 180/230 |
| 2004/0093974 A1 | * | 5/2004 | Nesseth | B62M 25/08 74/484 R |
| 2010/0082210 A1 | * | 4/2010 | Kobayashi | F16H 59/72 701/66 |

FOREIGN PATENT DOCUMENTS

EP    3763973 A1 *  1/2021 ............ B62M 25/02

* cited by examiner

*Primary Examiner* — Justin Holmes
(74) *Attorney, Agent, or Firm* — Rosenberg, Klein & Lee

(57) ABSTRACT

A transmission structure of electric clutchless motorcycle includes an electric motor, a variable speed gear set, a variable speed gear box and a gear position sensing unit. The arrangement of the gear position sensing unit is so configured that the transmission structure of electric clutchless motorcycle mechanism not only maintains the inertial energy recharge of the electric motor to increase the endurance of the vehicle, but also allows the driver to accurately control the speed control knob when switching gears, and furthermore can increase the automatic gear shift function of the electric gear shift design.

8 Claims, 14 Drawing Sheets

| Gear position \ Magnetic sensing element | A | B | C |
|---|---|---|---|
| N | | | |
| 1 | ● | | |
| 2 | ● | ● | |
| 3 | | ● | ● |
| 4 | | | ● |

TRANSMISSION STRUCTURE OF ELECTRIC CLUTCHLESS MOTORCYCLE

BACKGROUND OF THE INVENTION

1. Field of the Invention

The present invention relates to cam transmission technology, in particular, it refers to an electric gear shifting design that not only maintains the inertial energy recharge of the electric motor to increase the endurance of the vehicle, but also allows the driver to accurately control the speed when switching gears, and furthermore can increase the automatic gear shift function.

2. Description of the Related Art

Generally, fuel engines have a long reaction time due to acceleration and deceleration. If there is no clutch control, it will cause a flameout situation at the start. The acceleration and deceleration reaction time of electric vehicles is short, so there is no problem of flameout at the start. The previous case has been reviewed and approved U.S. patent application Ser. No. 16/580,064 is mainly driven by the above electric motor with a belt to drive the power input shaft, through the transmission gear set, the output sprocket, and then the chain is used to transmit the power to the rear wheel, so no clutch is required.

Just use the speed control knob appropriately when shifting gears to slightly reduce the motor speed, and reduce the torque load of the transmission gear set, and then you can use the gear shift lever to easily enter or retreat. However, the aforementioned operations still require the driver to control the speed control lever based on experience to switch gears.

However, it was learned from the actual implementation experience of the U.S. patent application Ser. No. 16/580,064 that has been reviewed and approved in the previous case, in order to increase the endurance of the vehicle, when the deceleration and braking inertial energy recharging function is added, because the previous electric motor 1 only needs to drive the vehicle when the recharging function is not added, therefore, when you want to switch gears, you can easily use the speed control knob 61 (as shown in FIG. 3) to slightly reduce the speed of the electric motor 1 and reduce the torque load point D (as shown in the FIG. 4) of the active transmission gear 4231 and the driven transmission gear 4221 in the transmission gear box 4, and it can be easily shifted into or out of gear. However, after the recharge function is added, when the driver receives the speed control knob 61, the electric motor 1 will be transformed into a generator for recharging energy, and the vehicle is still running and still needs to push the electric motor 1 to generate electricity. It makes the meshing active transmission gear 4231 and driven transmission gear 4221 in the transmission gear box 4 appear the torque load point E in the opposite direction (as shown in FIG. 5). Therefore, the driver needs to control the speed control knob 61 more accurately between the positive and negative torque loads of the meshing active transmission gear 4231 and the driven transmission gear 4221, so as to smoothly enter or retreat without gearing. This will increase the difficulty of switching gears.

SUMMARY OF THE INVENTION

The present invention is a further improved design of the present inventor's previously applied U.S. patent application Ser. No. 16/580,064. It is therefore the main object of the present invention to provide a transmission structure of electric clutchless motorcycle mechanism, which not only maintains the inertial energy recharge of the electric motor to increase the endurance of the vehicle, but also allows the driver to accurately control the speed control knob when switching gears, and furthermore can increase the automatic gear shift function of the electric gear shift design.

The transmission structure of electric clutchless motorcycle of the present invention comprises an electric motor, a motor control circuit, a variable speed gear set, a variable speed gear box and a gear position sensing unit. The variable speed gear set is set in the variable speed gear box. The variable speed gear set comprises a power input shaft, a rotational speed output shaft, an active transmission gear mounted on the power input shaft, a corresponding driven transmission gear mounted on the rotational speed output shaft, a power input pulley provided at one end of the power input shaft, a motor pulley assembled on a rotating shaft of an electric motor, a belt set between the motor pulley and the aforementioned power input pulley, so that the electric motor is capable of using the belt to drive the power input shaft of the variable speed gear set and through a shift lever and a shift shaft, a connecting rod, which is provided at one end of the shift shaft and is pivotally connected to an extension arm, drives the extension arm to push and pull a gear shift plate, so that the gear shift plate provided at one end of a shift fork shaft is capable of driving the shift fork shaft to control a shift fork to control the active transmission gear and the driven transmission gear to move correspondingly to produce a speed change, and the generated speed is output by the rotational speed output shaft in the variable speed gear set, and a speed output sprocket provided on the rotational speed output shaft drives a rear wheel of the vehicle equipped with the transmission structure with a chain. In order to make shifting smoother, the gear position sensing unit comprises a set of magnetic elements arranged on a side surface of the gear shift plate and a magnetic sensing circuit with three magnetic sensing elements at positions corresponding to the gear shift plate. By generating each gear change when shifting gears and making each gear change on the gear shift plate when the gear shift plate rotates, the magnetic elements on the gear shift plate and the magnetic sensing elements of the magnetic sensing circuit generate a variety of preset sensing changes to generate the correct gear sensing function for each gear. In addition to entering the first gear in neutral, the correct gear position of the variable speed gear box will be detected through the magnetic induction between the magnetic elements and the magnetic sensing elements when each gear is changed. Disconnect the power connection of the electric motor at the right time through the set motor control circuit, so that the electric motor is in a no-load idling stater to release and reduce the transmission pressure when any two active transmission gear and driven transmission gear mesh with each other in the variable speed gear box. Then, use the shift lever to easily complete the shift operation. After the gear shift is completed, it is detected that the variable speed gear box has been shifted through the magnetic induction between the magnetic elements and the magnetic sensing elements. Then, restore the power connection of the electric motor through the motor control circuit to control the normal acceleration and deceleration of the vehicle.

The main purpose of the present invention is to detect the correct gear position of the variable speed gear box through the magnetic induction between the magnetic elements and the magnetic sensing elements. Disconnect or connect the motor control circuit in time to make the electric motor idling without load to facilitate speed change or drive the vehicle, and the electric motor inertial energy recharge to increase the endurance of the vehicle. At the same time, the driver does not need to accurately control the speed control knob when switching gears, but can increase the function of automatic gear shifting.

BRIEF DESCRIPTION OF THE DRAWINGS

FIG. 17-1 is a perspective view of still another embodiment of the invention in which the motor power-off button switch is set to the original clutch lever of the handle grip on the left of the vehicle.

DETAILED DESCRIPTION OF THE PREFERRED EMBODIMENTS

Figure 1:
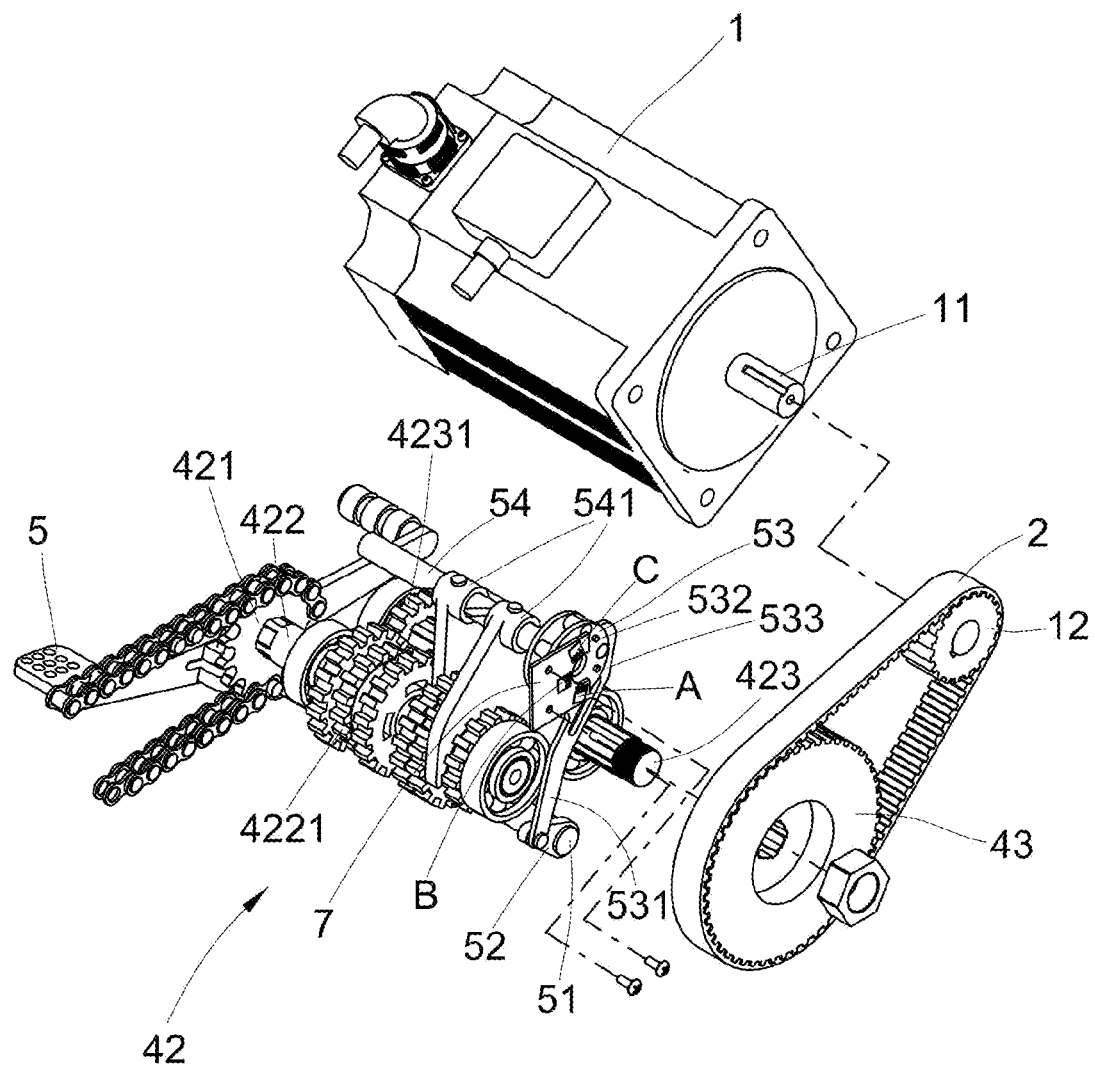
FIG. 1 is an exploded view of a transmission structure of electric clutchless motorcycle in accordance with the present invention.
Figure 2:
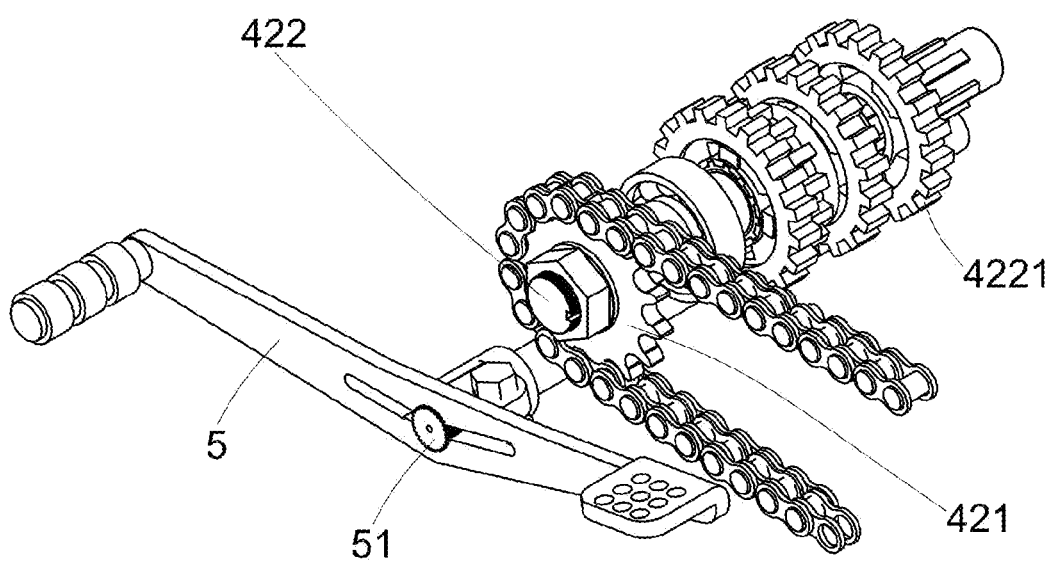
FIG. 2 is a partial three-dimensional view of the shift lever, shift shaft and rotational speed output shaft of the present invention.
Figure 3:
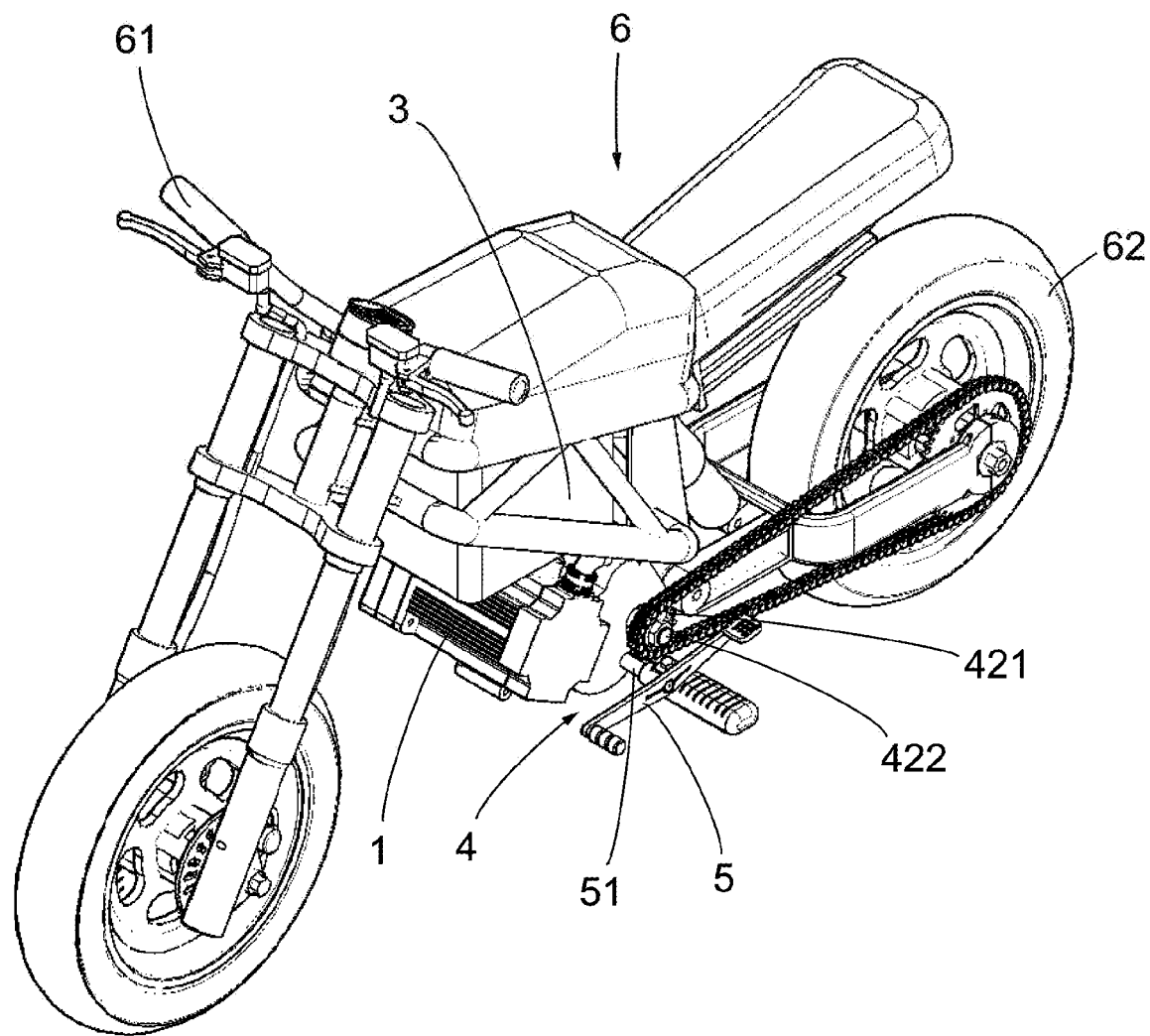
FIG. 3 is a perspective view of an embodiment of the present invention when it is actually combined on a motorcycle.
Figure 4:
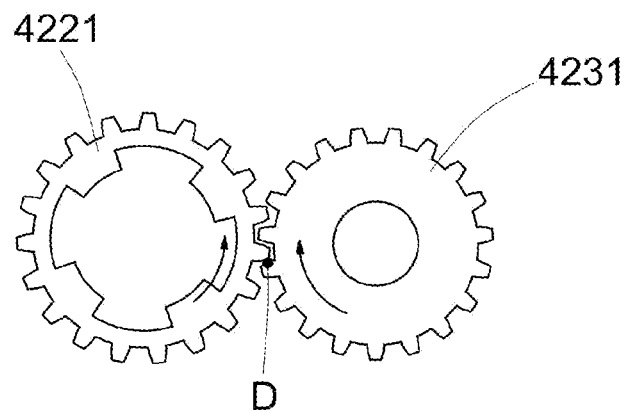
FIG. 4 is a schematic diagram of the pressure point generated by the transmission pressure when the active transmission gear and the driven transmission gear are meshed with each other when the electric motor is driving.
Figure 5:
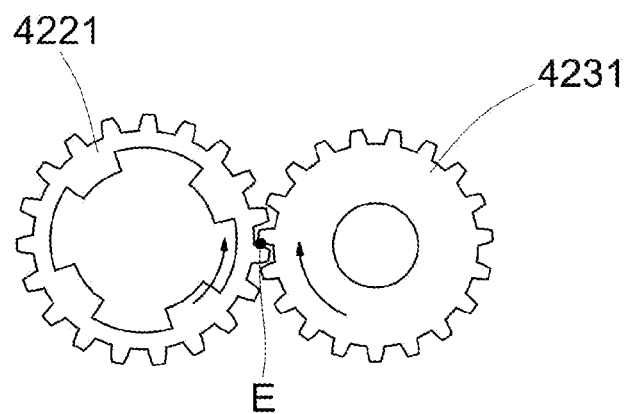
FIG. 5 is a schematic diagram of the pressure point generated by the transmission pressure when the active transmission gear and the driven transmission gear are meshed with each other when charging with electric motor feedback.

Referring to FIGS. 1-3, the present invention relates to a transmission structure of electric clutchless motorcycle, which mainly comprises an electric motor 1, a variable speed gear set 42, and a variable speed gear box 4. The variable speed gear set 42 is set in the variable speed gear box 4. The variable speed gear set 42 comprises a power input shaft 423, a rotational speed output shaft 422, a set of active transmission gears 4231 mounted on the power input shaft 423, and a corresponding set of driven transmission gears 4221 mounted on the rotational speed output shaft 422. A power input pulley 43 is provided at one end of the power input shaft 423. A motor pulley 12 is assembled on the rotating shaft 11 of the electric motor 1. A belt 2 is set between the motor pulley 12 and the aforementioned power input pulley 43, so that the electric motor 1 can use the belt 2 to drive the power input shaft 423 of the variable speed gear set 42. Through the shift lever 5 and the shift shaft 51, the connecting rod 52, which is provided at one end of the shift shaft 51 and is pivotally connected to the extension arm 531, drives the extension arm 531 to push and pull the gear shift plate 53, so that the gear shift plate 53 provided at one end of the shift fork shaft 54 can drive the shift fork shaft 54 to control the shift fork 541 to control the active transmission gears 4231 and the driven transmission gears 4221 to move correspondingly to produce a speed (gear position) change. The generated speed is output by the rotational speed output shaft 422 in the variable speed gear set 42, and the speed output sprocket 421 provided on the rotational speed output shaft 422 drives the rear wheel 62 of the vehicle 6 with a chain. There is a battery 3 in front of the saddle of the vehicle 6 to provide the necessary power (as shown in FIG. 3).

Figure 7:
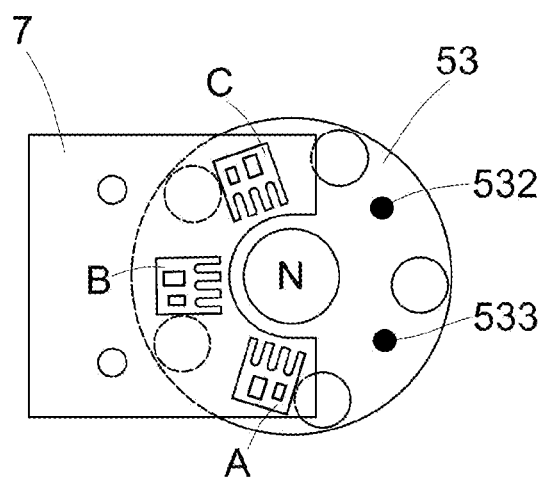
FIGS. 7 to 14 are the state diagrams of the present invention in which the magnetic sensing elements and the magnetic elements of the magnetic sensing circuit generate the preset sensing changes to generate the correct position sensing function when each gear is switched.
Figure 8:
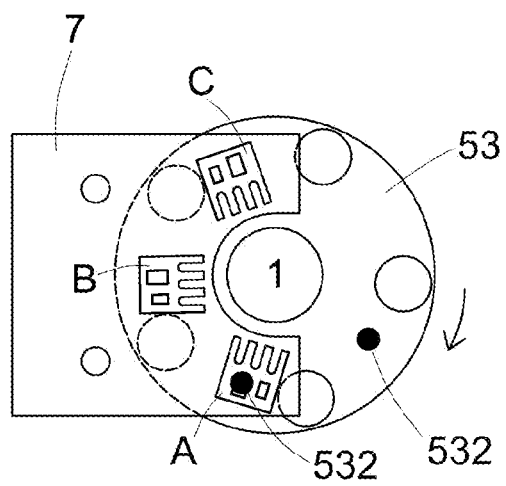
Figures 14, 15:
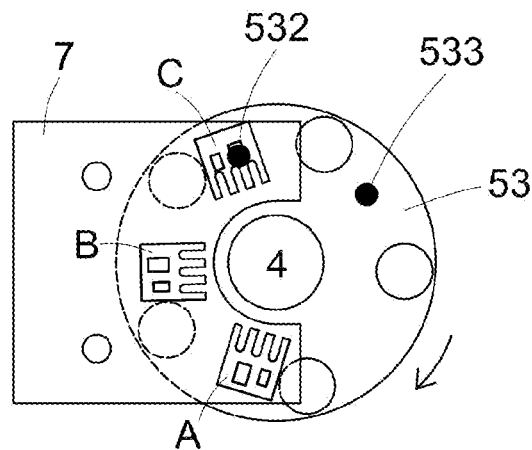
FIG. 15 is a comparison diagram of the present invention in which the magnetic elements and the magnetic sensing elements of the magnetic sensing circuit generate the preset sensing changes to generate the correct gear when each gear is switched.

The present invention also comprises a gear position sensing unit. The gear position sensing unit comprises a set of magnetic elements 532, 533 arranged on the side surface of the gear shift plate 53, and a magnetic sensing circuit 7 with magnetic sensing elements A, B, and C at positions corresponding to the gear shift plate 53. By generating each gear change when shifting gears and making each gear change on the gear shift plate 53 when it rotates, the magnetic elements 532, 533 on the gear shift plate 53 and the magnetic sensing elements A, B, and C of the magnetic sensing circuit 7 generate a variety of preset sensing changes to generate the correct gear sensing function for each gear. When the gear shift plate 53 is driven into neutral, the magnetic elements 532 and 533 are located at positions where any of the magnetic sensing elements A, B, and C of the magnetic sensing circuit 7 are not sensed, as shown in FIGS. 7 and 15. The output signal of the magnetic sensing circuit 7 knows the correct position of the neutral gear of the variable speed gear box 4, so that when the vehicle is in neutral gear, the driver does not need to precisely control the opening degree of the speed control knob when the driver wants to enter the first gear from neutral and turn the speed control knob. At this time, the motor control circuit 71 can control the electric motor 1 to output only a very low speed, so that the active transmission gear 4231 and the driven transmission gear 4221 corresponding to the first gear are engaged. When the first gear is correctly engaged, the motor control circuit 71 immediately resets the speed of the electric motor 1 to zero, so that the vehicle is ready to start. When the driver wants to start from the first gear after the correct engagement, the speed control knob 61 of the speed control must be reset to zero and then the speed control knob 61 will be turned again, and the vehicle will start to move forward. Therefore, it can completely avoid the danger of vehicle rushing due to improper opening of the speed control knob 61 when starting, as shown FIGS. 7, 8 and 15.

Figure 6:
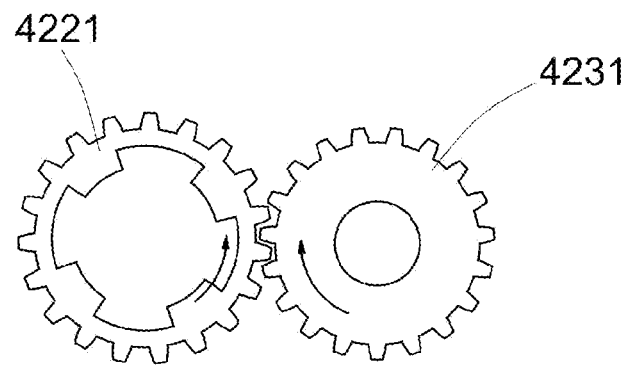
FIG. 6 is a schematic diagram of the relationship between the active transmission gear and the driven transmission gear to release transmission pressure when the power of the electric motor is disconnected, the electric motor is in a no-load idling state.
Figure 9:
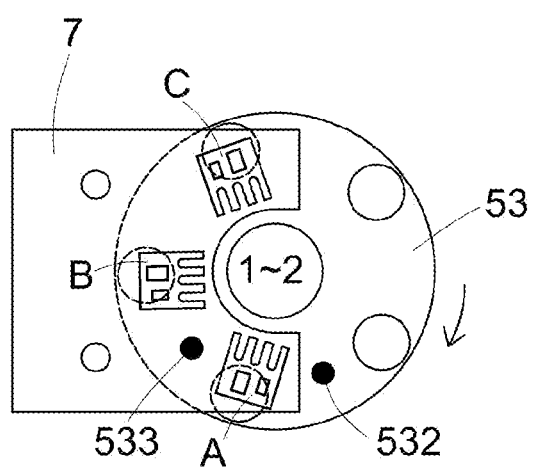
Figure 10:
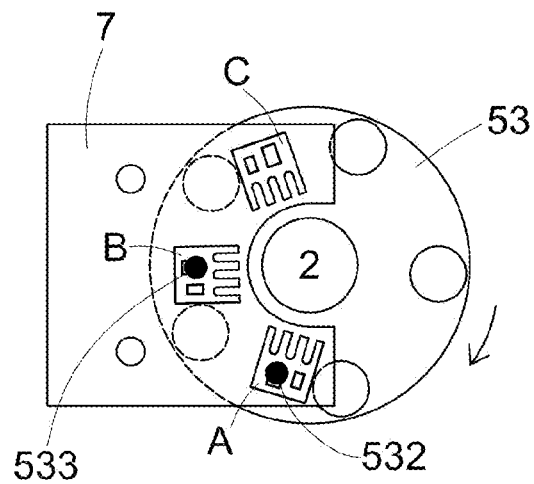

When the gear shift plate 53 is driven from the 1st gear to the 2nd gear, the magnetic elements 532 and 533 are located on both sides of the magnetic sensing element A of the magnetic sensing circuit 7 and are not sensed by any of the magnetic sensing elements A, B, and C of the magnetic sensing circuit 7, as shown in FIG. 9. At this time, the motor control circuit 71 can control the power of the electric motor 1 to be disconnected so that the electric motor 1 is in a no-load idling state to release the transmission pressure when the active transmission gear 4231 and driven transmission gear 4221 mesh with each other corresponding to the first gear in the variable speed gear box 4, as shown in FIG. 6. Then use the shift lever 5 to easily enter the second gear to complete the shift operation. At this time, the magnetic elements 532 and 533 sense the magnetic sensing elements A and B on the magnetic sensing circuit 7, and the variable speed gear box 4 is in the correct position of the second gear, as shown FIGS. 10 and 15.

Figure 11:
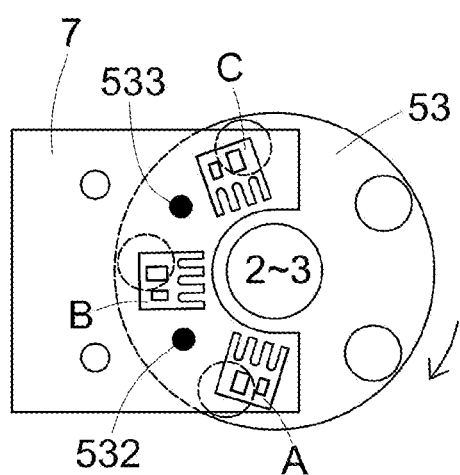
Figure 12:
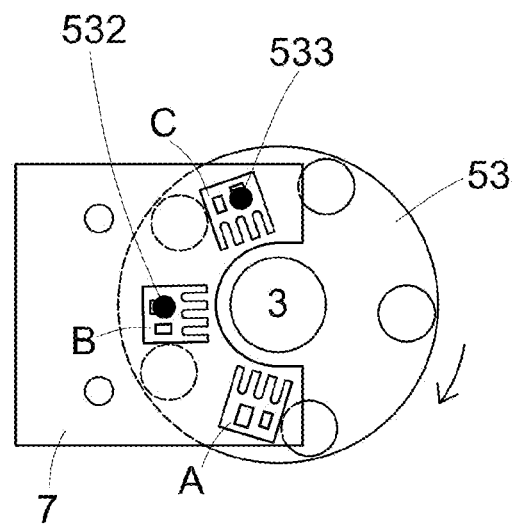
Figure 13:
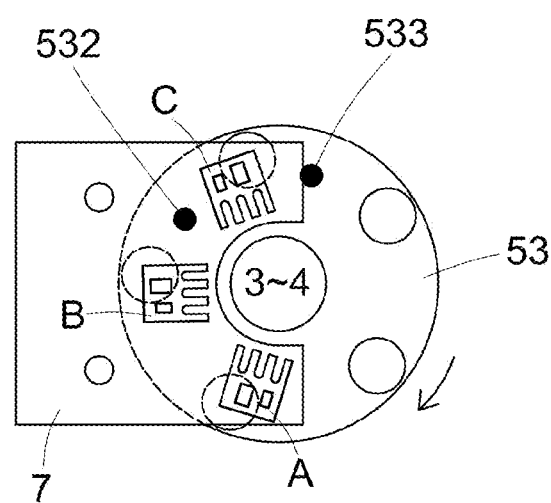

So on and so forth, when the gear shift plate 53 is driven from the 2nd gear to the 3rd gear or the 3rd gear to the 4th gear, the magnetic elements 532 and 533 will not generate a sensing position with any of the magnetic sensing elements A, B, and C of the magnetic sensing circuit 7, as shown FIGS. 11 and 13. At this time, the motor control circuit 71 can control the power of the electric motor 1 to be disconnected so that the electric motor 1 is in a no-load idling state to release the transmission pressure when the active transmission gear 4231 and driven transmission gear 4221 mesh with each other corresponding to the second gear in the variable speed gear box 4, as shown in FIG. 6, then use the shift lever 5 to easily enter the third gear and the fourth gear to complete the gear switching operation, as shown FIGS. 12, 14 and 15.

Figure 16:
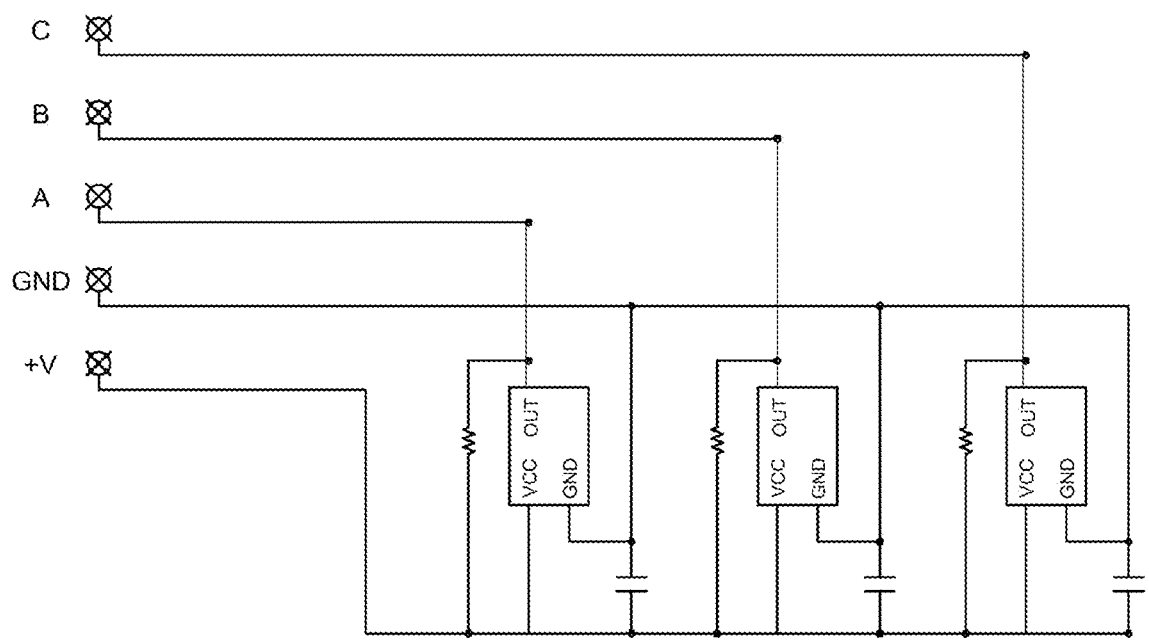
FIG. 16 is a circuit diagram of the motor control circuit of the present invention.

The processor programming in the motor control circuit 71 can process and detect the correct gear of the variable speed gear box 4 in a very short time. According to the software algorithm, the motor control circuit 71 can disconnect the connection with the electric motor 1 in a timely manner based on the gear position feedback from the gear position sensing unit. However, when the gear position sensing unit has multiple positions between the two gears, including neutral, none of the magnetic sensing elements A, B, and C on the magnetic sensing circuit 7 detects the magnetic elements 532,533. In order to distinguish from the aforementioned neutral signal, because the magnetic sensing elements A, B, and C of the magnetic sensing circuit 7 are not detected in the neutral position, the time stagnation is long, but the motor control circuit 71 detects this difference, therefore, the power of the electric motor 1 is not disconnected in neutral, instead, when the driver turns the speed control knob 61 in the neutral state, the electric motor 1 is controlled to output only a very low speed, so that the first gear can be engaged smoothly, so as to avoid improper operation of the speed control knob 61 to cause danger of a vehicle rushing when starting (as shown in FIG. 16). The magnetic sensing elements A, B, and C on the magnetic sensing circuit 7 can be replaced by copper contacts (not shown), and the magnetic elements 532, 533 on the side of the gear shift plate 53 can be replaced by copper brushes (not shown). The gear state is formed by the aforementioned multiple contact or non-contact between the copper contacts and the copper brushes, and the electric motor 1 is directly disconnected or connected through the motor control circuit 71 to produce the same effect.

Figure 17:
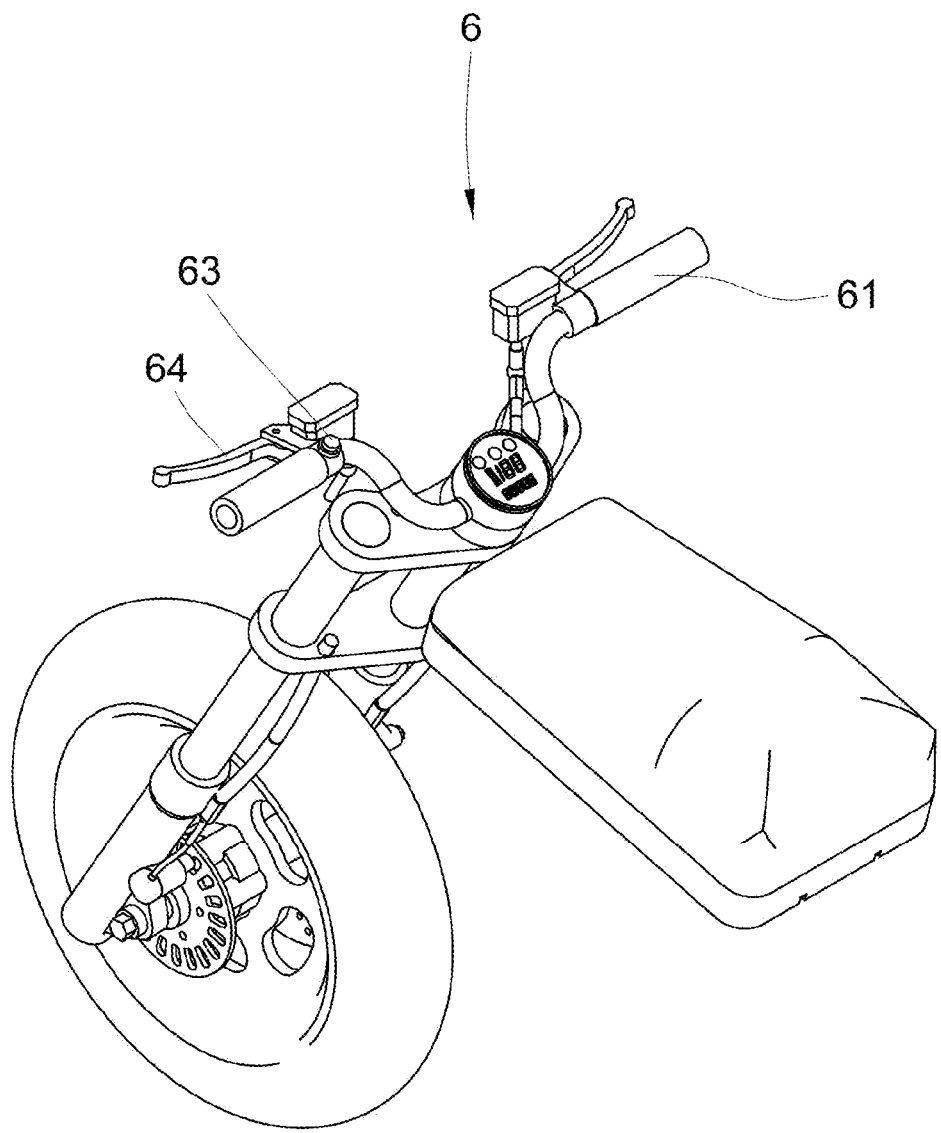
FIG. 17 is a perspective view of another embodiment of the invention in which a motor power-off button switch is added to the vehicle handle grip.
Figures 1, 17:
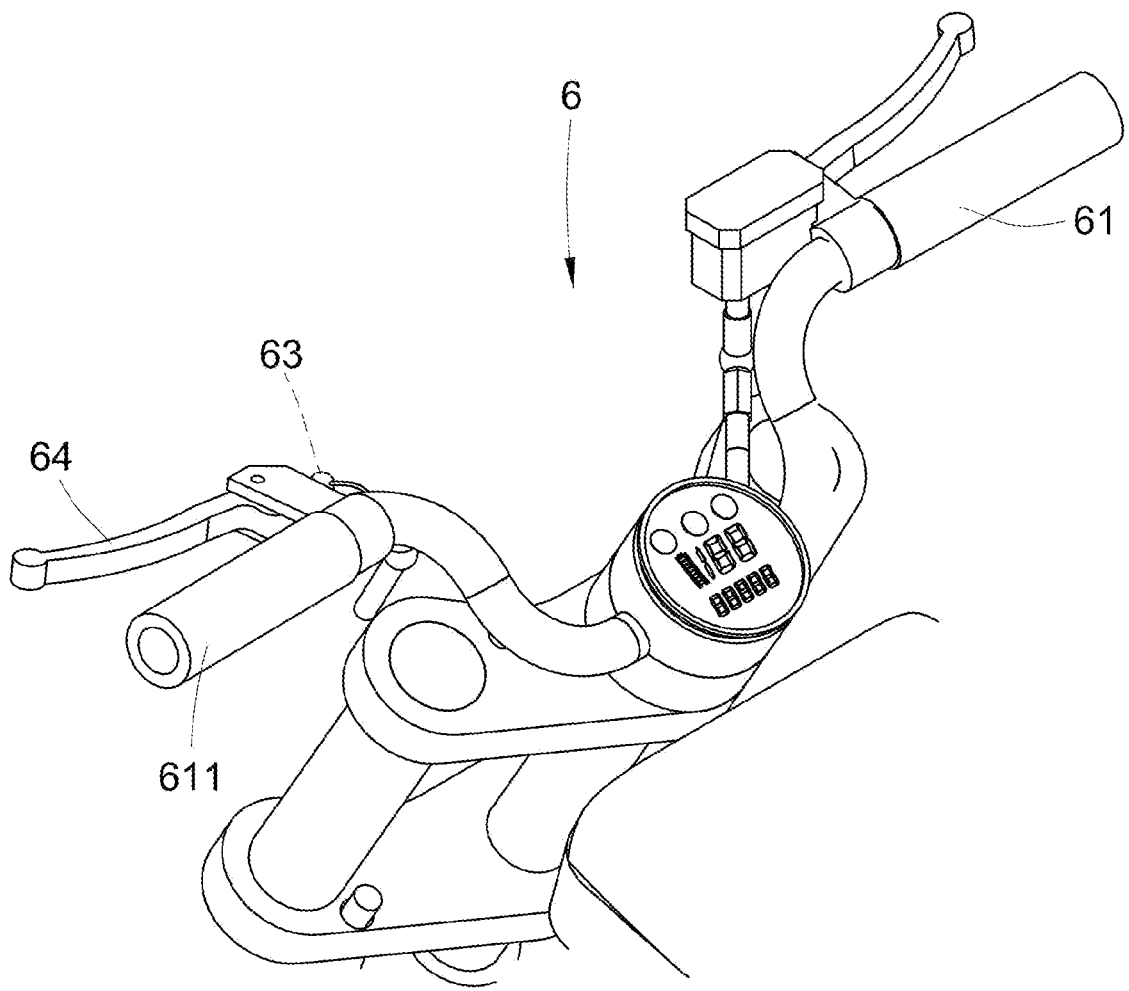

Please refer to FIG. 17, which is the second embodiment of the present invention. In this embodiment, the gear position sensing unit described is not provided, and a motor power-off button switch 63 is added to the handle grip 611 of the vehicle 6. When the driver wants to switch gears while on the move, first press the motor power-off button switch 63 to notify the motor control circuit 71 to be directly disconnected from the electric motor 1 so that the electric motor 1 is in a no-load idling state to release and reduce the transmission pressure when the corresponding active transmission gear 4231 and driven transmission gear 4221 mesh with each other in the variable speed gear box 4, as shown in FIG. 6. Then, use the shift lever 5 to easily complete the shift operation. After the gear switch is completed, release the motor power-off button switch 63 to notify the motor control circuit 71 and the electric motor 1 to restore the connection, without the need to precisely control the speed control knob 61, to control the normal acceleration and deceleration of the vehicle. The motor power-off button switch 63 can also be installed at the original clutch lever 64 of the handle grip 611 on the left side of the vehicle 6. By pressing the clutch lever 64 every time you change gears, you can touch the motor power-off button switch 63 and directly disconnect or connect the electric motor 1 through the motor control circuit 71 to make the electric motor 1 idling without load to facilitate speed change or drive the vehicle, and thee electric motor 1 inertial energy recharge to increase the endurance of the vehicle (as shown in FIG. 17-1).

Figure 18:
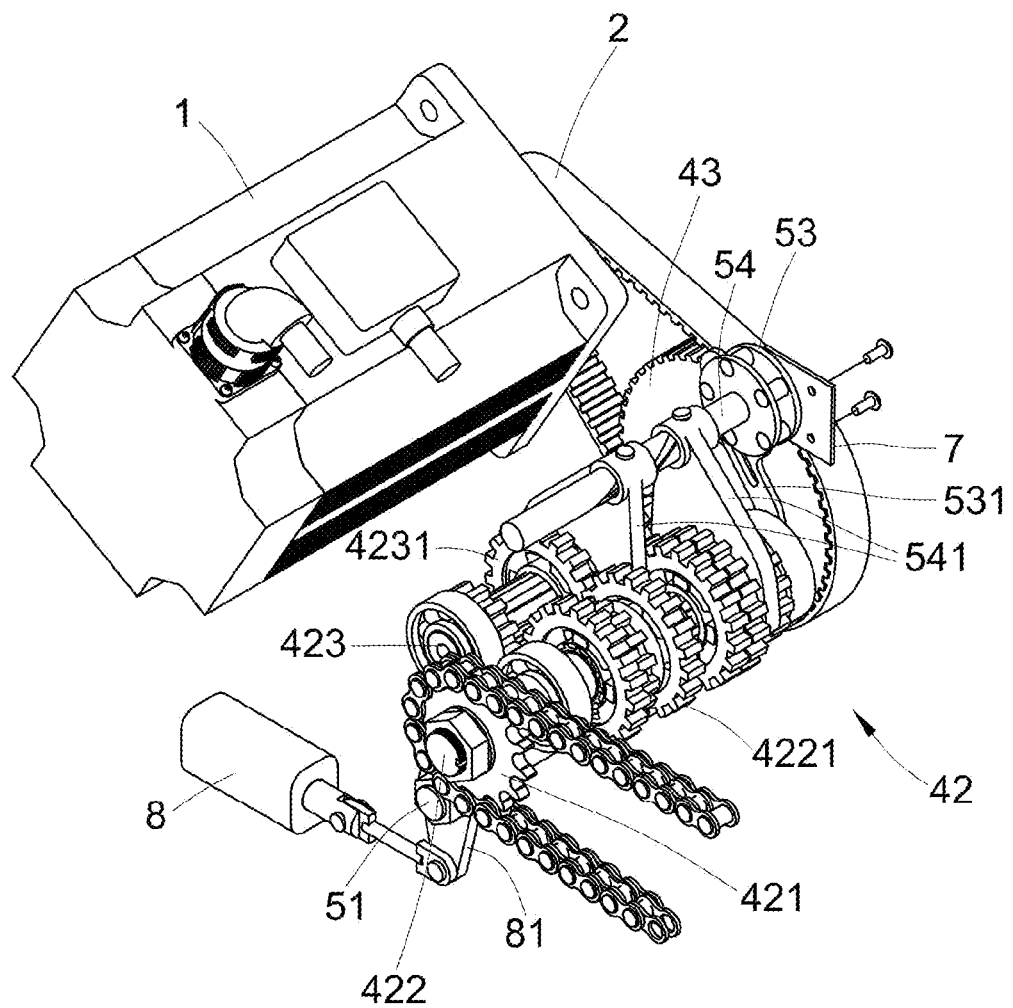
FIG. 18 is a perspective view of still another embodiment of the invention in which a push-pull solenoid coil for switching gears is added.
Figure 19:
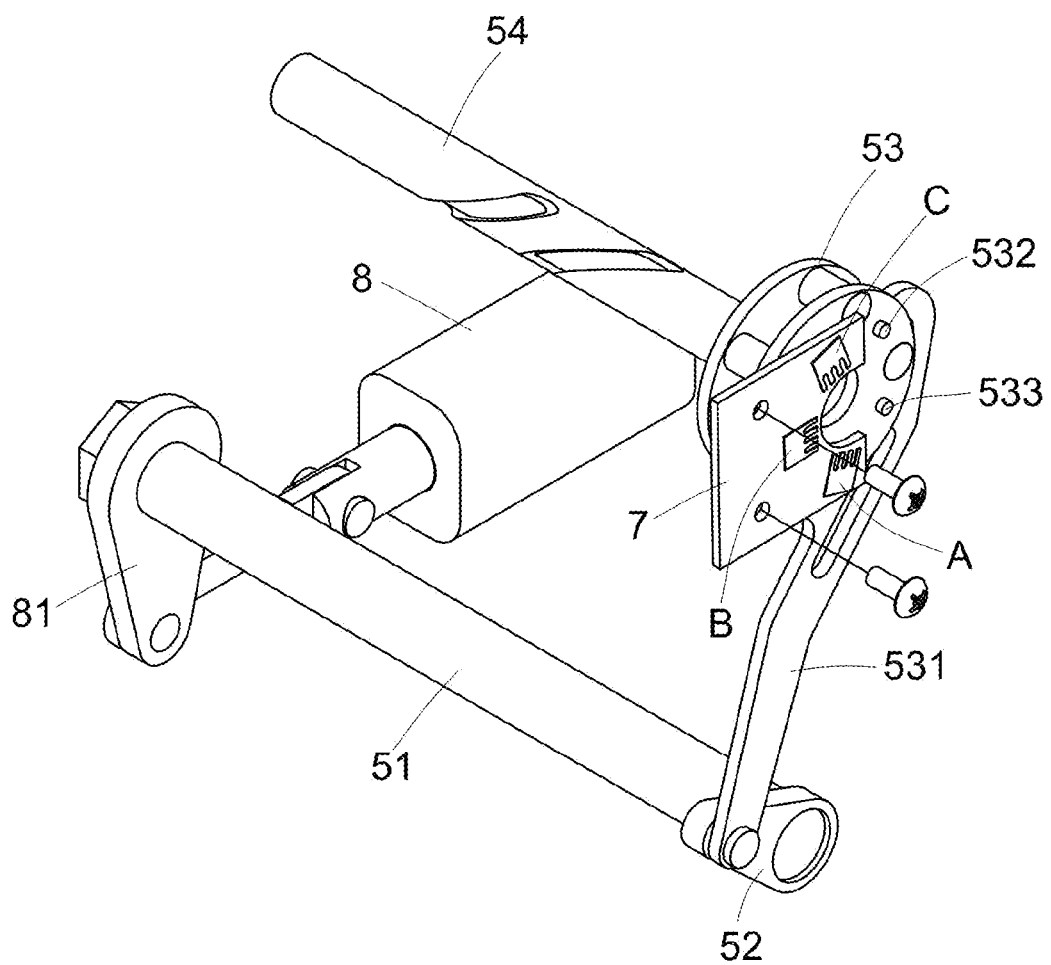
FIG. 19 is a simplified three-dimensional view of the structure shown in FIG. 18.

Please refer to FIG. 18 and FIG. 19, which are the third embodiment of the present invention. Furthermore, when the vehicle wants to achieve the automatic shift function controlled by the program when driving, add a push-pull solenoid coil 8 for shifting gear. The push-pull solenoid coil 8 is used to drive the shift shaft 51 through the push-pull rod 81, and the shift fork shaft 54 is controlled by the gear shift plate 53 to complete the automatic shift function of automatically shifting in or out according to the vehicle driving demand.

The driver only needs to operate the speed control knob 61, and the processor in the motor control circuit 71 can process the detected opening degree of the speed control knob 61, the correct gear, the vehicle travel speed, and the power consumption in a very short time. The processor in the motor control circuit 71 can be programmed to determine the load and energy consumption status of the vehicle in real time. According to the programming software algorithm, the best gear is automatically changed through the push-pull solenoid coil 8 through the program operation, so that the electric motor 1 is rationalized and the battery energy consumption is reduced. With the inertial energy recharging function of the electric motor 1 to supplement the battery power, it achieves the purpose of maximizing the battery life of the vehicle.

What the invention claimed is:

1. A transmission structure of electric clutchless motorcycle, comprising an electric motor, a motor control circuit, a variable speed gear set, a variable speed gear box and a gear position sensing unit, wherein:

said variable speed gear set is set in said variable speed gear box, said variable speed gear set comprising a power input shaft, a rotational speed output shaft, a set of active transmission gears mounted on said power input shaft, a corresponding set of driven transmission gears mounted on said rotational speed output shaft, a power input pulley provided at one end of said power input shaft, a motor pulley assembled on a rotating shaft of an electric motor, a belt set between said motor pulley and said aforementioned power input pulley, so that said electric motor is capable of using said belt to drive said power input shaft of said variable speed gear set and through a shift lever and a shift shaft, a connecting rod, which is provided at one end of said shift shaft and is pivotally connected to an extension arm, drives said extension arm to push and pull a gear shift plate, so that said gear shift plate provided at one end of a shift fork shaft is capable of driving said shift fork shaft to control a shift fork to control said active transmission gears and said driven transmission gears to move correspondingly to produce a speed change, and the generated speed is output by said rotational speed output shaft in said variable speed gear set, and a speed output sprocket provided on said rotational speed output shaft drives a rear wheel of the vehicle equipped with the transmission structure with a chain;

said gear position sensing unit comprises a set of magnetic elements arranged on a side surface of said gear shift plate and a magnetic sensing circuit with three magnetic sensors at positions corresponding to said gear shift plate; by generating each gear change when shifting gears and making each gear change on said gear shift plate when said gear shift plate rotates, said magnetic elements on said gear shift plate and said magnetic sensors of said magnetic sensing circuit generate a variety of preset sensing changes to generate the correct gear sensing function for each gear; the correct gear position of said variable speed gear box is known through the output signal of said magnetic sensing circuit; when said gear shift plate is driven to shift, said magnetic elements on said gear shift plate and said magnetic sensors on said magnetic sensing circuit generate a variety of different position signals for sensing; by receiving the said position signals through said motor control circuit and controlling the electric motor power to be disconnected so that said electric motor is in a no-load idling state to release the transmission pressure when the corresponding said active transmission gear and said driven transmission gear in each gear in said variable speed gear box are engaged with each other, the gear shift operation is completed through said shift lever; after the gear shift is completed, said magnetic elements on said gear shift plate and said magnetic sensors on said magnetic sensing circuit are used to obtain the signal that said variable speed gear box is in the correct gear, then, said motor control circuit receives the aforementioned signal and controls the electric motor power connection to restore said electric motor to rotate, and then the vehicle can be controlled to accelerate and decelerate normally.

2. The transmission structure of electric clutchless motorcycle as claimed in claim 1, wherein when said gear shift plate is driven into neutral, said magnetic elements are located at positions where no one of said magnetic sensors of said magnetic sensing circuit is sensed, the output signal of said magnetic sensing circuit knows the correct position of the neutral gear of said variable speed gear box, so that when the vehicle is in neutral gear, and when the driver wants to enter the first gear from neutral and turn a speed control knob, said motor control circuit is capable of controlling said electric motor to output only a certain speed, so that the said active transmission gear and the said driven transmission gear corresponding to the first gear are engaged; when the first gear is correctly engaged, said motor control circuit immediately resets the speed of said electric motor to zero, so that the vehicle is ready to start; when the driver wants to start from the first gear after the correct engagement, the speed control knob of the speed control is reset to zero and then the speed control knob is turned again, and the vehicle will start to move forward to completely avoid the danger of vehicle moving at an elevated speed due to improper opening of the speed control knob when starting.

3. The transmission structure of electric clutchless motorcycle as claimed in claim 1, wherein said motor control circuit has set therein a processor, the programming of said processor in said motor control circuit is capable of processing and detecting the correct gear of said variable speed gear box; according to a software algorithm, said motor control circuit is capable of disconnecting the connection with said electric motor responsive to the gear position feedback from said gear position sensing unit; when said gear position sensing unit has multiple positions between the two gears, including neutral, none of the magnetic sensors on the magnetic sensing circuit detects said magnetic elements, in order to distinguish from the neutral signal, because the magnetic sensors of said magnetic sensing circuit are not detected in the neutral position, the time stagnation is a certain time, but said motor control circuit detects this difference, therefore, the power of said electric motor is not disconnected in neutral, instead, when the driver turns said speed control knob in the neutral state, said electric motor is controlled to output only another certain speed, so that the said active transmission gear and the said driven transmission gear corresponding to the first gear are smoothly meshed.

4. The transmission structure of electric clutchless motorcycle as claimed in claim 1, wherein when the vehicle wants to achieve an automatic shift function controlled by the program when driving, add a push-pull solenoid coil for shifting gear and canceled the shift lever; a speed control knob signal is received by said motor control circuit to control said push-pull rod connected to said push-pull solenoid coil to drive said shift shaft, and the shift fork shaft is controlled by said gear shift plate to automatically shift in or out according to the vehicle driving demand to achieve the automatic shift function.

5. The transmission structure of electric clutchless motorcycle as claimed in claim 4, wherein the driver only needs to operate said speed control knob, and said processor in said motor control circuit is capable of processing the detected speed control knob opening, correct gear, vehicle travel speed and power consumption, and the motor control circuit processor programming is capable of determining the load and energy consumption status of the vehicle in real time;

according to the programming software algorithm, a gear corresponding to the energy consumption status of the vehicle is automatically changed through said push-pull solenoid coil by the program operation, which rationalizes power consumption of the electric motor, reduces a battery energy consumption, and supplements battery power with the electric motor inertial energy recharging function to achieve the purpose of maximizing vehicle battery life.

6. The transmission structure of electric clutchless motorcycle as claimed in claim 1, wherein said magnetic sensors on said magnetic sensing circuit are replaced by copper contacts, and said magnetic elements on the side of said gear shift plate are replaced by copper brushes; the gear state is formed by the aforementioned multiple contact or non-contact between said copper contacts and said copper brushes, and said electric motor is directly disconnected or connected through said motor control circuit.

7. A transmission structure of electric clutchless motorcycle, comprising an electric motor, a motor control circuit, a variable speed gear set, a variable speed gear box and a motor power-off button switch, wherein:

said variable speed gear set is set in said variable speed gear box, said variable speed gear set comprising a power input shaft, a rotational speed output shaft, a set of active transmission gears mounted on said power input shaft, a corresponding set of driven transmission gears mounted on said rotational speed output shaft, a power input pulley provided at one end of said power input shaft, a motor pulley assembled on a rotating shaft of an electric motor, a belt set between said motor pulley and said aforementioned power input pulley, so that said electric motor is capable of using said belt to drive said power input shaft of said variable speed gear set and through a shift lever and a shift shaft, a connecting rod, which is provided at one end of said shift shaft and is pivotally connected to an extension arm, drives said extension arm to push and pull a gear shift plate, so that said gear shift plate provided at one end of a shift fork shaft is capable of driving said shift fork shaft to control a shift fork to control said active transmission gears and said driven transmission gears to move correspondingly to produce a speed change, and the generated speed is output by said rotational speed output shaft in said variable speed gear set, and a speed output sprocket provided on said rotational speed output shaft drives a rear wheel of the vehicle equipped with the transmission structure with a chain; said motor power-off button switch is mounted to a handle grip of the vehicle; when the driver wants to switch gears while on the move, first press said motor power-off button switch to notify said motor control circuit to be directly disconnected from said electric motor so that said electric motor is in a no-load idling state to release and reduce the transmission pressure when the corresponding said active transmission gear and said driven transmission gear mesh with each other in said variable speed gear box, then, use the shift lever to complete the shift operation, and after the gear switch is completed, release said motor power-off button switch to notify said motor control circuit and said electric motor to restore the connection, without the need to precisely control said speed control knob, to control the normal acceleration and deceleration of the vehicle.

8. The transmission structure of electric clutchless motorcycle as claimed in claim 7, wherein said motor power-off button switch is selectively installed at a location adjacent a clutch lever of a handle grip on a left side of the vehicle; by pressing the clutch lever every time you change gears, you are capable of touching said motor power-off button switch and directly disconnecting or connecting said electric motor through said motor control circuit to make said electric motor idling without load to facilitate speed change or drive the vehicle, and an electric motor inertial energy recharge to increase the endurance of the vehicle.

* * * * *